R. B. WEAVER.
THREAD GAGE.
APPLICATION FILED SEPT. 26, 1918.
1,294,004. Patented Feb. 11, 1919.
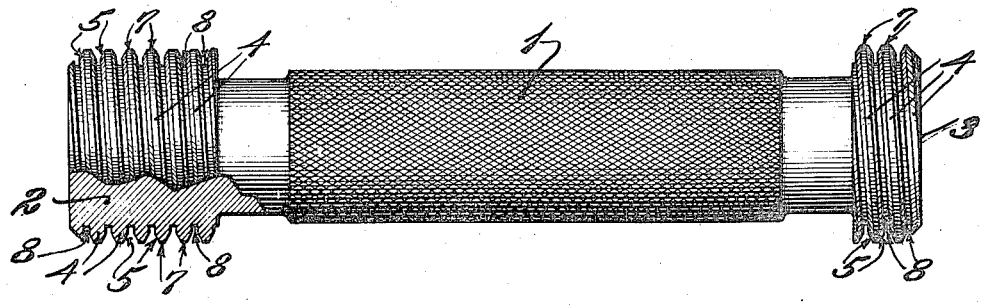
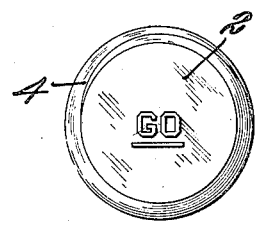 
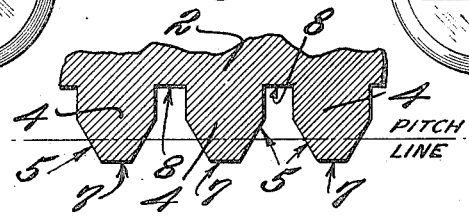
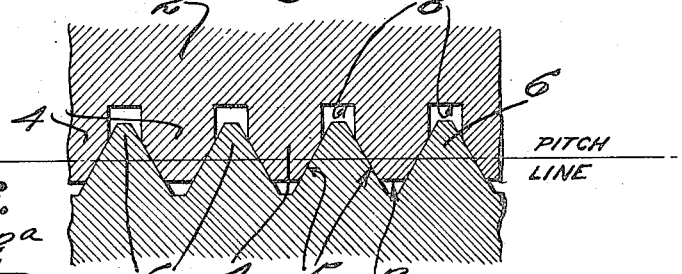
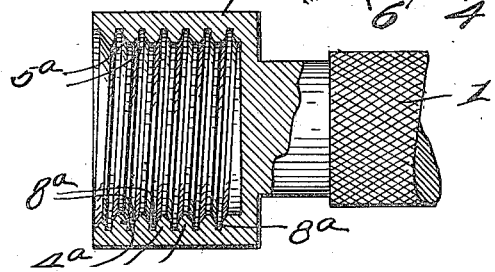
Inventor:
Robert B. Weaver,
by his Attys.

UNITED STATES PATENT OFFICE.

ROBERT B. WEAVER, OF DETROIT, MICHIGAN, ASSIGNOR TO THE TIMKEN-DETROIT AXLE COMPANY, OF DETROIT, MICHIGAN, A CORPORATION OF OHIO.

THREAD-GAGE.

1,294,004.  Specification of Letters Patent.  Patented Feb. 11, 1919.

Application filed September 26, 1918. Serial No. 255,821.

*To all whom it may concern:*

Be it known that I, ROBERT B. WEAVER, a citizen of the United States, and a resident of the city of Detroit, in the county of Wayne and State of Michigan, have invented a new and useful Improvement in Thread-Gages, of which the following is a specification.

My invention relates to thread gages and has for its principal object to provide for accurate measurement of the pitch diameter of screw threads. It consists principally in making the thread of the gage with narrow gaging surfaces that extend only slightly on each side of the pitch circle so that the measurements will not be affected by conditions at either the root or tip of the thread. It also consists in the construction and arrangements hereinafter described.

In the accompanying drawing wherein like numerals refer to like parts wherever they occur, Figure 1 is a side elevation of a thread gage embodying my invention, the lower portion of the threads on the head of smaller diameter being shown in cross-section;

Fig. 2 is an end elevation of the gage looking at the head of smaller diameter;

Fig. 3 is an end elevation of the gage looking at the head of larger diameter;

Fig. 4 is an enlarged detail view showing the shape of the gage threads in cross-section;

Fig. 5 is a schematic view on an enlarged scale showing the gage threads applied to the standard type of thread; and Fig. 6 is a cross-section of one end of a gage for gaging male threads in accordance with my invention.

My device comprises an elongated body or handle portion 1 at whose ends are enlarged heads or plugs 2 and 3. Each of these heads is of cylindrical form and is provided on its outer surface with a helical rib or thread 4, the threads of the respective heads being of the same pitch and otherwise similar but of slightly different pitch diameter. The gaging surfaces 5 of the gage thread have the proper inclination and the proper space relation to each other to fit the portions of the surfaces of a standard female thread 6 close to its pitch circle as illustrated in Fig. 5. In order to enable the measurement of a thread to be made at its pitch diameter without being affected by other portions of the surface of such thread, the gaging surfaces 5 of the gage are restricted to narrow bands that extend only slightly on each side of the pitch diameter thereof, say, for instance, about three hundredths of an inch on each side for a diameter of an inch and a half. For this purpose, the portion of the gage rib or thread corresponding to the point or tip of an ordinary screw thread is removed or flattened as at 7 almost to the pitch circle; and at the root of the thread a rectangular groove 8 is formed, whose side walls likewise reach almost to the pitch circle. The narrow inclined bands 5 bordered by the groove and by the flattened tip may be considered as the portion of the original surface of a standard male thread close to the pitch circle thereof and on both sides thereof. Thus, in cross-section, the shape of the gage thread is a rectangle with its outer corners beveled and with the bevel crossing the pitch circle.

As suggested above, the pitch diameter and the outside diameter of one plug or head 2 is slightly less than that of the other head 3, say, about three thousandths of an inch less. It is preferable to make the narrower head of sufficient length to receive the full thickness of the nut or female thread to be tested. In practice, this smaller head 2 is commonly marked "Go" and the larger head 3 is commonly made shorter and marked "Not go". For convenience, the ends of the heads are beveled.

The device is used as follows: The smaller end 2 is first screwed into the nut or female thread 6. The fact that the gage enters the nut shows that the diameter of the thread of the nut is ample. Then the nut is removed from the smaller plug, and the larger plug is applied thereto. If the larger plug can be screwed into the nut, the pitch diameter of the nut is shown to be excessive and the same should be rejected as being over size.

By reason of the contact or gaging surfaces of the gage ribs being limited to the narrow strips immediately next to the respective pitch circles thereof, the measurements indicate the pitch diameter of the thread undergoing test without being affected by conditions existing elsewhere than immediately adjacent to the pitch circle of said thread.

While the invention is described above as applied to a gage for gaging female threads, it is applicable to gages for male threads also. For this purpose the ends 2ª of the gage are made hollow, and standard or normal female threads 4ª of slightly different pitch and inside diameter are cut in such hollow ends. (See Fig. 6.) The working surface of each of these threads is then narrowed by cutting a groove 8ª at the root thereof reaching almost to its pitch circle and by cutting away or flattening the tip almost to the pitch circle thereof, thus leaving only narrow bands 5ª of the original surface of the thread. These narrow bands extend slightly on opposite sides of the pitch circle and should accurately fit the gaging surfaces of the corresponding gage for female threads.

What I claim is:

1. A limit thread gage comprising a body portion and end portions, helical ribs on said end portions, the edges of said ribs being beveled to conform to the surfaces of the standard thread in the region of its pitch circle, said helical ribs being of the same pitch but having their beveled surfaces of slightly different pitch diameter.

2. A thread gage comprising a body portion with threaded ends, the threads of the respective ends being similar but of slightly different pitch diameter, the gaging surfaces of said threads being limited to narrow bands located at the respective pitch circles thereof and the threads being cut back on both sides of said bands.

3. A limit thread gage comprising a body portion with threaded ends, the threads of the respective ends being similar but of slightly different pitch diameter, each thread being like a normal thread with the portions adjacent to the tip and root removed to leave only narrow bands of the original surfaces, said narrow bands extending only slightly on each side of the respective pitch circles.

4. A thread gage comprising a body portion whose end portions are provided with threads of rectangular section with their corners beveled, said threads being of the same pitch but having their beveled portions of slightly different diameter substantially as and for the purpose set forth.

5. A limit thread gage comprising a body portion with threaded ends, the threads of the respective ends being similar but of slightly different pitch diameter, the threads being of rectangular section with their corners beveled to form narrow bands that extend only slightly on each side of the respective pitch circles.

6. A limit thread gage comprising a body portion with externally threaded ends, the threads of the respective ends being similar but of slightly different pitch diameter, the threads being of rectangular section with their outer corners beveled to form narrow bands that extend only slightly on each side of the respective pitch circles.

Signed at Detroit, Michigan, this 21 day of Sept., 1918.

ROBERT B. WEAVER.